United States Patent [19]
Nishita et al.

[11] Patent Number: 4,591,827
[45] Date of Patent: May 27, 1986

[54] PCM CODER-DECODER

[75] Inventors: Shigeo Nishita, Kokubunji; Kazuo Yamakido, Nishitama; Kenichi Ohwada, Yokosuka, all of Japan

[73] Assignees: Hitachi, Ltd.; Hitachi Micro Computer Engineering Ltd., both of Tokyo, Japan

[21] Appl. No.: 702,224

[22] Filed: Feb. 15, 1985

[30] Foreign Application Priority Data

Feb. 22, 1984 [JP] Japan .................................. 59-30288

[51] Int. Cl.$^4$ .............................................. H04M 3/00
[52] U.S. Cl. ............................ 340/347 C; 179/18 BC; 370/62
[58] Field of Search ............... 340/347 C; 179/18 BC; 370/62

[56] References Cited

U.S. PATENT DOCUMENTS 4,119,807 10/1978 Nahay .................................... 370/62
4,190,742  2/1980 Southard ......................... 179/18 BC Primary Examiner—Charles D. Miller
Attorney, Agent, or Firm—Antonelli, Terry & Wands

[57] ABSTRACT

Disclosed is a PCM coder-decoder having a construction such that a digital filter contained originally in the PCM coder-decoder is utilized on the time division basis in order to fold back a digital reception signal to a digital signal transmission side and thus to accomplish interruption, communication exchange between three parties, gain control, fold-over test of the PCM signal, and so forth, in addition to the coding and decoding functions inherent to the PCM coder-decoder.

7 Claims, 4 Drawing Figures

PCM CODER-DECODER

BACKGROUND OF THE INVENTION (1) Field of the Invention

This invention relates to a PCM coder-decoder, and more particularly to an audio PCM coder-decoder (or PCM CODEC) for use in subscriber's circuits of a digital switchboard, or the like.

(2) Description of the Prior Art

Development of digital switchboards has been made in recent years, and a conference telephone system which realizes simultaneous exchange of telephone communication between three or more parties has been proposed as one of the applications of the digital switchboards.

In order to accomplish the conference telephone system, a part of the reception signal must be folded back and be superposed on a transmission signal in a subscriber's circuit.

The conference telephone system proposed in the past employs a method which disposes separately a PCM multiplextor besides the PCM codec, converts the multiplexed PCM signal to an analog signal and adds it, in order to realize the function described above. Therefore, this system involves the following problems.

(1) The PCM multiplexor is indispensable, and it is difficult to reduce the cost of the apparatus and to improve actual packaging density.

(2) A signal-to-noise ratio S/N deteriorates due to quantizing noise generated in the conversion process of PCM signal→analog signal→PCM signal, and the like.

(3) The operation speed of the A/D convertor becomes drastically higher in proportion to the multiplexing rate, and the design and actual packaging of analog circuits become difficult.

(4) The absolute volume of delay time becomes great for the timing adjustment in the PCM multiplexor.

SUMMARY OF THE INVENTION

It is a primary object of the present invention to provide a PCM codec which can fold over a reception signal and superpose on a transmission signal without impeding the original coding and decoding function of the PCM codec and without using a PCM multiplexor.

In order to accomplish the object described above, the present invention utilizes on the time division basis a multiplyer and an adder of a digital filter constituting a PCM codec so that the digital filter can exhibit its original filter function as well as a fold-over function of a reception signal.

The present invention can provide a PCM codec which makes it possible (1) to make interruption and exchange of communication between three parties, (2) to make gain control and (3) to conduct fold-over test of PCM signals by merely changing a part of the drive circuit of a digital filtet that has been put into practical application in the past, without using the PCM multiplexor described above.

The above and other objects and features of the present invention will become more apparent from the following description taken in conjunction with the accompanying drawings.

DESCRIPTION OF THE PREFERRED EMBODIMENTS

Hereinafter, the present invention will be described in detail with reference to preferred embodiments thereof.

Figure 1:
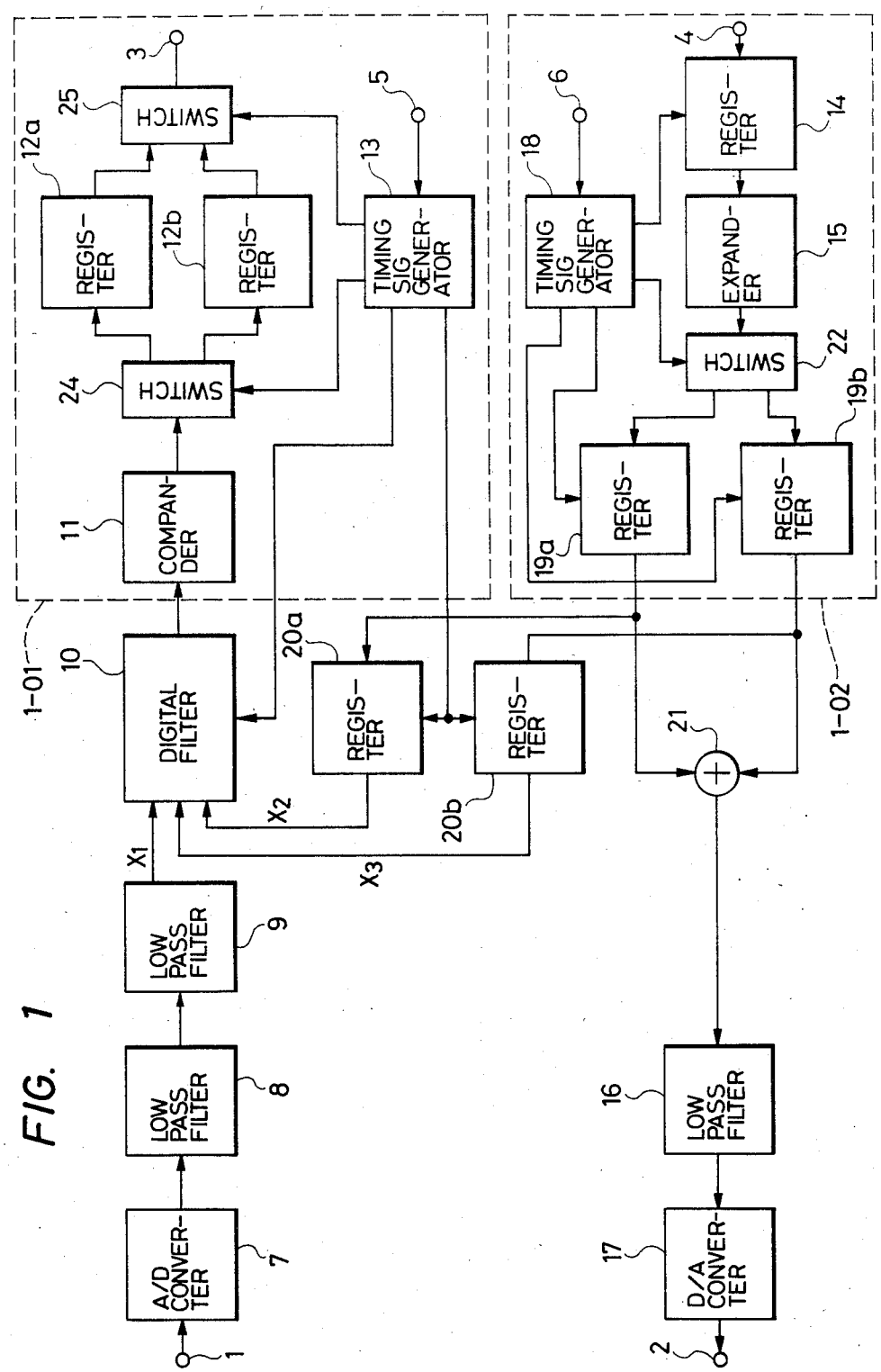
FIG. 1 is a block diagram showing the construction of a PCM coder-decoder in accordance with one embodiment of the present invention.

FIG. 1 is a block diagram showing the construction of a PCM coder-coder (codec) in accordance with one embodiment of the present invention.

An audio analog signal applied to an input terminal 1 is converted to a linear PCM signal by an analog-digital convertor (hereinafter called "AD convertor") 7, and is then applied to a high-pass filter 10 which has a multiplexing function and consists of a digital filter that constitutes the principal portion of the present invention. The construction and operation will be described in detail elsewhere. This filter 10 exhibits its high-pass filter function on the time division basis for the signal A from the input terminal 1 (the signal from a first subscriber), and at the same time adds this signal A to reception signals of the later-appearing registers 20a and 20b (the signals B and C of second and third subscribers).

The output of the digital filter 10 is applied to an output control circuit 101. That is, the output of the digital filter 10 is converted to a companded PCM code of μ-law (or A-law) by a compander 11, and is then stored temporarily in a PCM output buffer register 12a or 12b via a switch circuit 24. A timing signal generator 13 generates control signals necessary for driving the portions of the coder described above on the basis of a PCM output sync signal applied from an input terminal 5. The signals of the registers 12a and 12b are delivered by part of the control signals to a transmission line such as a highway (not shown) from a PCM signal output terminal 3 through the switch circuit 25.

In a decoder section, on the other hand, an input sync signal and a PCM input signal are applied from the input terminals 6 and 4 to an input control circuit 102, respectively. A second timing signal generator 18 generates control signals on the basis of the input sync signal applied thereto from the input terminal 6, and companded PCM signals (B, C) of the second and third speakers from the PCM input terminal 4 are stored continuously and temporarily in a PCM input register 14 on the basis of the control signals generated by the second timing signal generator 18. Next, an expander 15 converts the companded PCM signal of the register 14 to a linear PCM signal. A switch circuit 22 is driven by the control signal from the timing generator 18, and the linear PCM signals of the second and third speakers are temporarily stored in the registers 19a and 19b. The signals of these registers 19a and 19b are transferred to registers 20a and 20b, respectively, and are added by an adder 21. The output of the adder 21 is converted to an analog signal through a low-pass filter 16 and a digital-analog convertor (D/A convertor) 17, is produced from the output terminal and is thereafter applied to a telephone set (not shown).

In the construction described above, the high-pass filter 10 consists of a digital filter, and the signal B of the register 20a is added to the signal A from the input terminal 1 by the adder of the digital filter on the basis of the control signal generated by the timing signal generator 13. Similarly, the signal C of the register 20b is added to the signal A on the time division basis, and the sums are applied as A+B and A+C to the registers 12a and 12b, respectively, as described already.

PCM signals which have these amplitudes A+B and A+C and are companded are sequentially produced from the output terminal 3, so that the second and third speakers can receive the composite signals of A+B and A+C, respectively, by converting the companded PCM signals using the conventional PCM codecs. Thus, speech between these three parties becomes possible.

Figure 2:
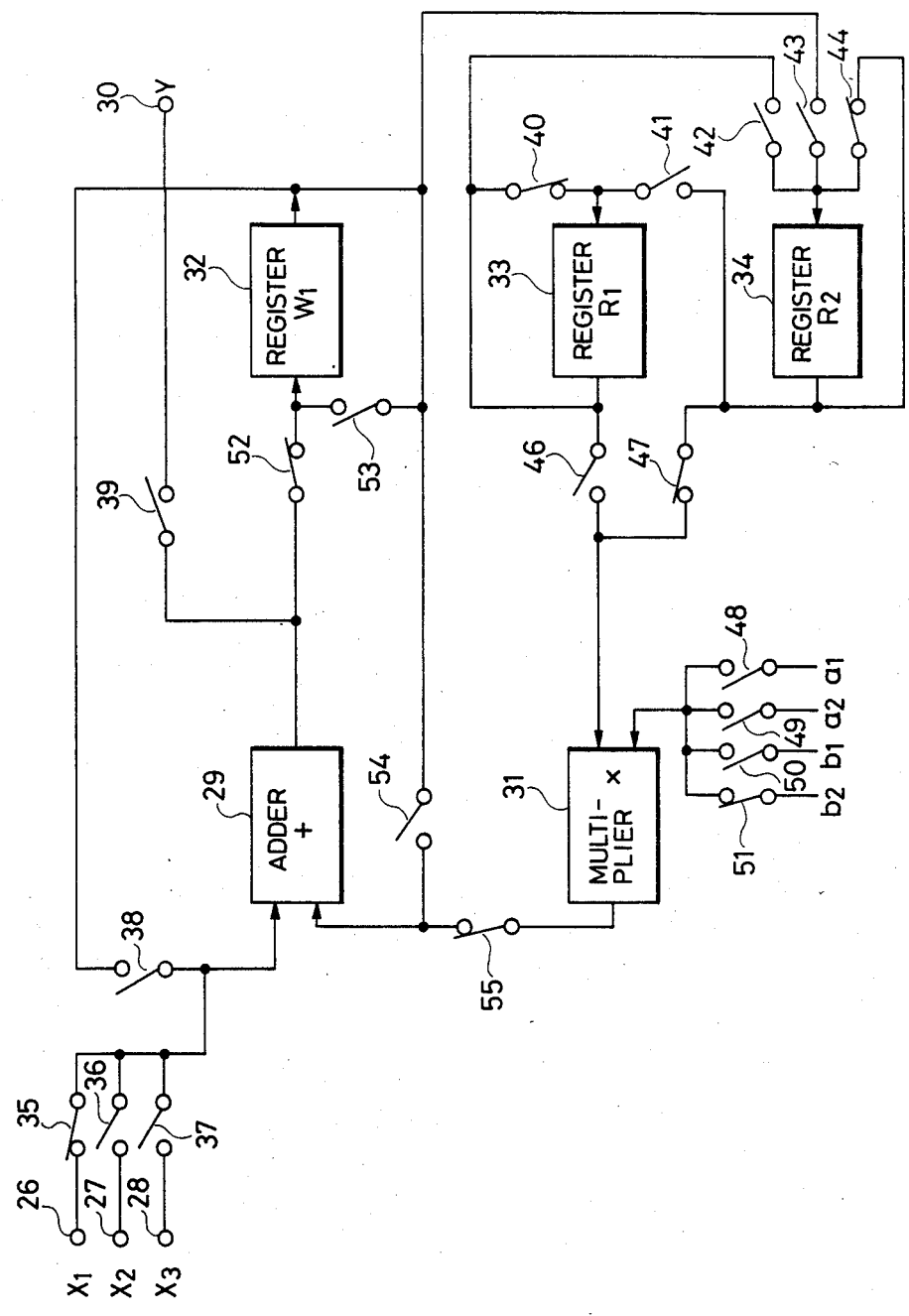
FIG. 2 is a circuit diagram showing the construction of the digital filter used in the PCM coder-decoder shown in FIG. 1.

FIG. 2 shows an example of the construction of the digital filter 10 that constitutes the high-pass filter described above, and FIG. 3 is a time chart useful for explaining the operation of the digital filter, and showing the open-closed state of each switch forming the filter shown in FIG. 2.

This filter exhibits the function of a high-pass filter operating at a fundamental frequency $f_s$ (which is the same as the sampling frequency of a signal) and executes processing of A+B and A+C described above using an idle time other than the time necessary for the filter function.

In FIG. 2, the output ($X_1$) of the low-pass filter 9, the output ($X_2$) of the register 20a and the output ($X_3$) of the register 20b shown in FIG. 1 are applied to input terminals 26, 27 and 28, respectively. Reference numeral 30 represents the output terminal of the filter, 29 is an adder, 31 is a multiplyer, 32 through 34 are registers, and 35 through 55 are switches.

Figure 3:
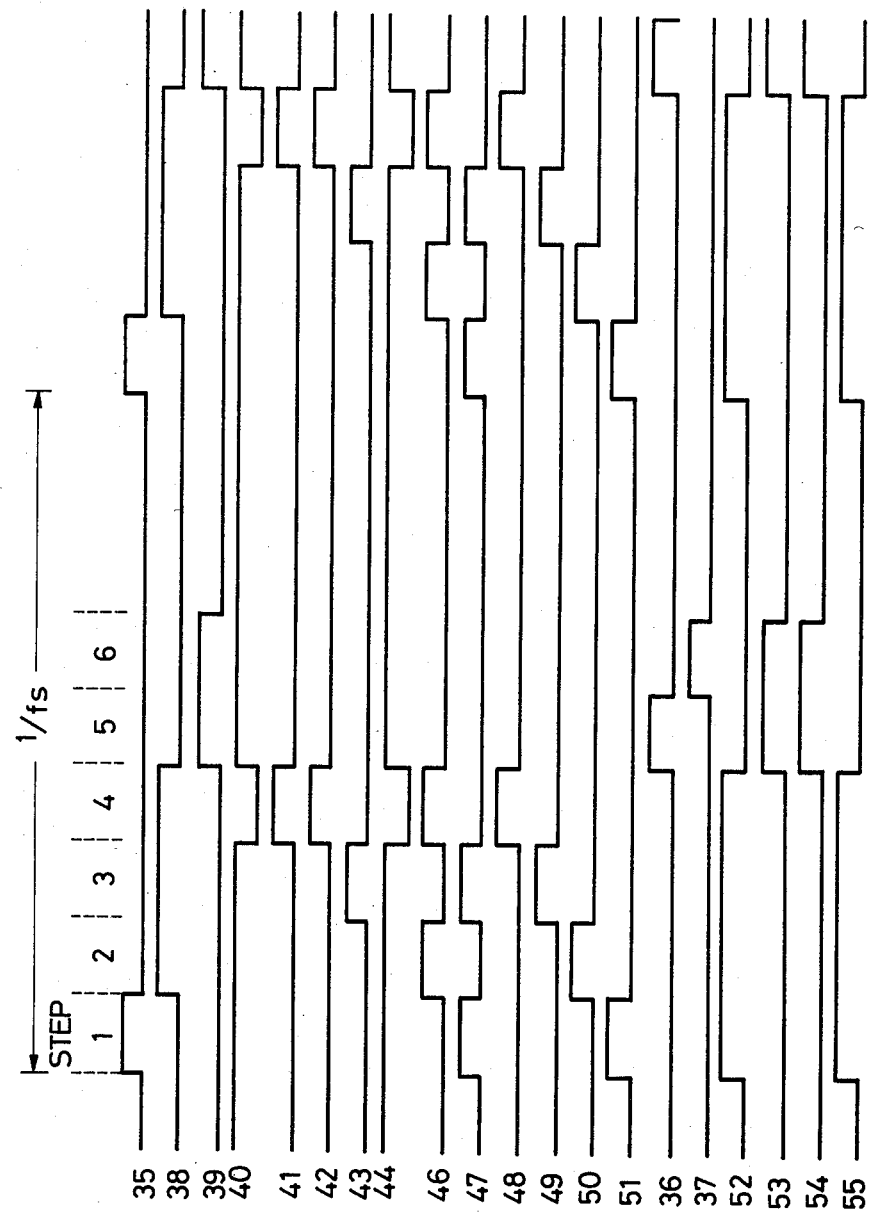
FIG. 3 is a time chart useful for explaining the operation of the digital filter shown in FIG. 3.

The operation of the digital filter will be explained with reference to FIG. 3. The circuit of FIG. 2 is a driven by clock signals having a frequency which is by far higher than the sampling frequency $f_s$ described above. Therefore, the fundamental period ($1/f_s$) is divided into a plurality of time steps. The signals shown in FIG. 3 are generated by the timing signal generator 13 shown in FIG. 1.

Steps 1 through 4 represent the operation periods in which the digital filter exhibits the filter function of a high-pass filter. Incidentally, the high level of switch signals in FIG. 3 represents the conductive state and the low level does the switch cut-off state. Numerals on the left represent the switch number. When the digital filter operates as the high-pass filter, the switches 36, 37, 39, 52, 53, 54 and 55 are in the state of connection shown in FIG. 2.

At the step 1, each switch assumes the state shown in the time chart, and the data $R_2(1)$ of the register 32 is multiplied by a multiplier $b_2$ by the multiplyer 31 to provide the product $b_2 \times R_2(1)$, is then added to the input $X_1(1)$ by the adder 29 and is applied to the register 32 and becomes $W_1(1)$. At the same time, since the value of the register 34 is held, it is fed back through the switch 44, and hence $R_2(1) = R_2(2)$. Here, the numeral in the parenthesis represents the step number.

At the second step, $R_1(2)$ of the register 33 is multiplied by a multiplier $b_1$, is added to the data $W_1(1)$ of the register 32 by the adder 29, and $W_1(1) + b_1 \times R_1(2)$ is stored in the register 32 as $W_1(2)$. The register 33 holds $R_1(2)$.

At the third step, the data $R_2$ of the register 34 is multiplied by a multiplier $a_2$, is then added to the data $W_1(2)$ of the register 32 by the adder 29, and is stored as $W_1(3) = W_1(2) + a_2 \times R_2$ in the register 32. At the same time, the data $W_1(2)$ of the register 32 is held by the register 34.

At the last fourth step as the filter operation, the data $R_1$ of the register 33 is multiplied by a multiplier $a_1$ by the multiplyer 31, is then added to the data $W_1(3)$ of the register 32 by the adder 29 and is thereafter stored as $W_1(4) = W_1(3) + a_1 \times R_1$ in the register 32. At the same time, the data $R_1$ of the register 33 is replaced by the data $R_2$ of the register 34 [that is, $W_1(2)$].

In other words, the result of calculation $W_1(2)$ up to the second step is equal to $W(n)$ with respect to the input sampling data $X_1(n)$, and the data $R_1$ of the register 33 and the data $R_2$ of the register 34 are $W_1(2)$ with respect to the previous sampling data and $W_1(2)$ with respect to the sampling data which is before the previous sampling data, respectively; that is, $R_1 = W(n-1)$ and $R_2 = W(n-2)$, respectively. Therefore, $$X_1(n) + b_1 \times W(n-1) + b_2 \times W(n-2) = W(n) \quad (1)$$

Furthermore, since the result of calculation $W_1(4)$ of the fourth step is produced as the output signal $Y(n)$ from the output terminal 30, $$W(n) + a_1 \times W(n-1) + a_2 \times W(n-2) = Y(n) \quad (2)$$

The data $R_1$ and $R_2$ of the registers 33 and 34 are $W(n)$ and $W(n-1)$, respectively, and they represent that the registers 33 and 34 operate as delay registers for the sampling data.

If the transfer function of the filter is expressed by a Z function using equation (1) and (2) described above, $W(n-m)$ can be expressed at $Z^{-m} \cdot X(z)$. Therefore, $$H(z) = \frac{Y(z)}{X(z)} = \frac{Z^0 + a_1 \times Z^{-1} + a_2 \times Z^{-2}}{Z_0 - b_1 \times Z^{-1} - b_2 \times Z^{-2}}$$

Thus, the digital filter has the characteristics of a cyclic digital filter, and various filter ring characteristics can be realized by stipulating a coefficient.

At the step 5 after the functional operation of the high-pass filter is completed, the switches 39, 40, 44, 36, 53 and 54 are turned on with the rest being turned off. Therefore, the content of the register 32 is applied to the adder 29 via the switch 54, is added to the data $X_2$ (the signal of the subscriber B) applied from the input terminal 27, through the switch 36, and is thereafter produced as the output signal from the terminal 30 through the switch 39. This output signal is transferred to the compander 11.

At the same time in this case, the output of the register 32 is again inputted and held through the switch 53.

At the step 6, the switch 36 is turned off while the switch 37 is turned on with the rest being under the same condition as in the case of the step 5. Therefore, due to the same operation as that of the step 5, $X_1 + X_2$ (the signal of A+C) as the sum of the signal $X_3$ (the signal of the subscriber C) from the input terminal 28 and the signal $X_1$ (the signal A of the first subscriber) held by the register 32 at the step 5 is produced at the output terminal 30.

The description given above deals with the case where the three parties simultaneously exchange telephone communication. When the communication is made as ordinarily between two parties, an arrangement may be made so that the signals X₂ and X₃ reach the silent level at the steps 5 and 6 described above. Though the data are transferred serially in the embodiment described above, they may be also transferred in parallel with one another, and the switches 40, 44 and 53 can be omitted in such a case.

Figure 4:
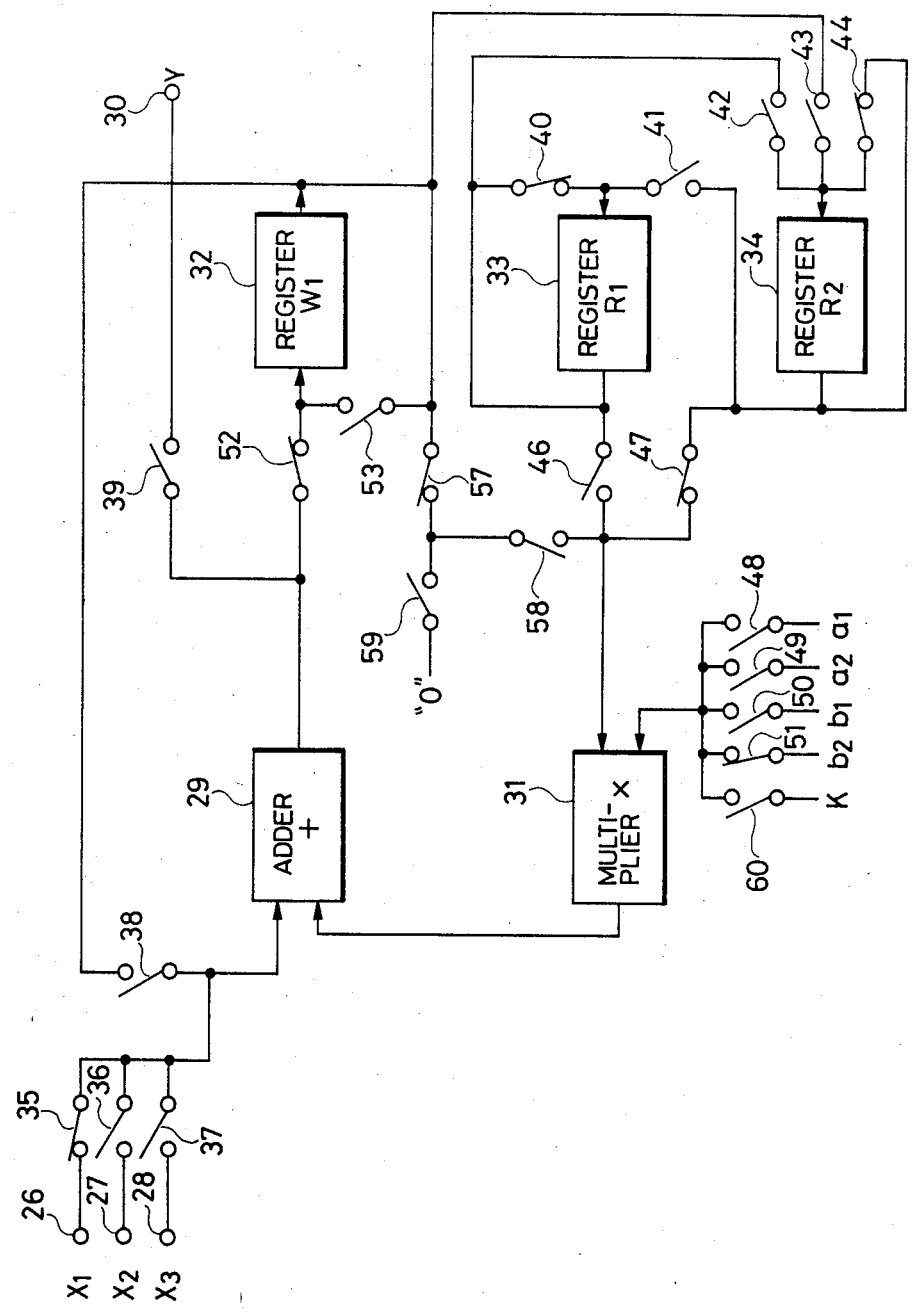
FIG. 4 is a circuit diagram of another example of the digital filter used in FIG. 1.

FIG. 4 shows another example of the construction of the digital filter 10. This construction is directed to make it possible (1) to make gain control of the first speaker (a), (2) to carry out PCM fold-over test, and (3) to realize waiting state of one party during the communication exchange between the three parties.

The construction of FIG. 4 is different from that shown in FIG. 2 in that the switch 54 of FIG. 2 is deleted, and switches 57, 58, 59 and 60 are added afresh. The fundamental operation is the same as that of FIG. 2. The high-pass filter function as the fundamental function of the digital filter relies upon the ON-OFF state of switches of FIG. 4 and is carried out during the steps 1 through 4.

In the period of the steps 5 and 6, the output of the register 32 is applied to the multiplyer 31 through the switches 57 and 58, and at the same time a coefficient K is given to the multiplyer 31 through the switch 60, thereby effecting gain control of the first speaker.

In the period of the steps 5 and 6, too, the switches 58 and 59 are turned on, and a signal of a silent level ("0") is applied to the multiplyer 31 in place of the output of the register 32. According to this arrangement, only the signals X₂ and X₃ of the second and third parties (B) and (C) received from the input terminals 27 and 28 are produced at the output terminal 30, so that the reception signals are folded over and can be used for the fold-over test.

The waiting state of one party described in item (3) described above can be established in the following way. At the step 5, the signal X₂ is set to the silent level ("0") and the switch 39 is turned off at the step 6. Furthermore, the output of the output register 12a or 12b (the register storing therein the data to be transmitted to B) is set to "0". Thus, the silent level is received by the party B. (Alternatively, arbitrary tone may be transferred, whenever necessary.) On the reception side, on the other hand, the output of the register among the registers 19a and 19b in the embodiment shown in FIG. 2, which receives the data of the party B, is kept to be always "0". If the party C must be made to wait, on the other hand, the switch 52 is turned off at the step 5, and the signal X₃ is set to "0" at the step 6. Then, the output of the register among the registers 19a and 19b of FIG. 2, which stores therein the data of C, is set to be always "0".

Each of the functions described above can be thus accomplished easily by adding a few change-over switches to the construction shown in FIG. 2 and the circuit of the digital filter.

In the PCM coder/decoder in accordance with the present invention, simultaneous exchange of communication between three or more parties can be made by adding a few logic circuits to the digital filter which is originally provided to the PCM coder-decoder, without using a PCM multiplexor, and moreover, new services such as gain control, PCM fold-over test, temporary waiting of a specific party during simultaneous exchange of telephone communication between the three parties, and so fourth, can be provided readily.

What is claimed is:

1. A PCM coder-decoder comprising:
   a coder portion including an A/D convertor for converting an analog signal to a digital signal, a first digital filter connected to the output of said A/D convertor, and an output control circuit processing the output of said first digital filter and producing the output as a PCM signal to a transmitter;
   a decoder portion including an input control circuit receiving said PCM signal from a transmission line and processing said PCM signal, a second digital filter processing a digital signal received from said input control circuit, and a D/A convertor decoding the output of said second digital filter to the analog signal; and
   a plurality of kinds of registers holding respectively a plurality of kinds of signals obtained from said input control circuit;
   said first digital filter executing filtration processing of the output of said A/D convertor and addition of the output of a plurality of said registers and the filtered output on the time division basis by means of the signals from said output control circuit.

2. The PCM coder-decoder according to claim 1 wherein said first digital filter includes:
   an adder for adding first signals and feedback signals applied through a first switch group changing over the output of said A/D convertor and the output of a plurality of said registers on the time division basis;
   a delay register group delaying the output of said adder;
   a feedback circuit using a product signal obtained by multiplying the output of said register group by a multiplier as the feedback signal; and
   a second switch group selecting a plurality of multiplier input terminals and said input terminals on the time division basis as the portion for obtaining said product signal.

3. The PCM coder-decoder according to claim 2 wherein a plurality of kinds of said registers are first and second registers for storing first and second audio signals obtained by said input control circuit, respectively.

4. The PCM coder-decoder according to claim 3 wherein said first digital filter has a transfer function H(Z) satisfying the following relation:

$$HZ = \frac{Z^0 + a_1 \times Z^{-1} + a_2 \times Z^{-2}}{Z_0 - b_1 \times Z^{-1} - b_2 \times Z^{-2}}$$

where $a_1$, $a_2$, $b_1$ and $b_2$ are multipliers applied through said second switch group, and $Z^{-m}$ is an operator of the Z function.

5. The PCM coder-encoder according to claim 1 wherein said output control circuit includes:
   a code compander for converting the code of the output of said first digital filter;
   third and fourth registers;
   a first switch changeably applying the output of said code compander to said third and fourth registers;
   a second switch changing over the output of said third and fourth registers and sending it to said transmission line; and a timing signal generator enabling the time division operation of said first digital filter and driving said first and second switches;

and said input control circuit includes:

an input buffer register holding a reception PCM signal;

an expander converting the signal from said input buffer register;

a third switch changeably applying the output of said expander to a plurality of said registers; and a timing signal generator controlling the write-in and read-out operation of a plurality of said registers and controlling said third switch.

6. The PCM coder-decoder according to claim 5 wherein said first digital filter includes:

an adder for adding first signals and feedback signals applied through a first switch group changing over the output of said A/D convertor and the output of said third and fourth registers on the time division basis;

a delay register group delaying the output of said adder;

a multiplyer multiplying the output of said register group by a multiplier;

a feedback circuit using the output of said register group and said adder as the feedback signal; and a second switch group selecting the multipliers to be multiplied by said multiplyer.

7. The PCM coder-decoder according to claim 6 wherein said first digital filter has different operation modes consisting of a plurality of steps obtained by dividing the sampling period into a plurality of time steps, has at a part of said steps the characterisitcs of a high-pass filter having a transfer fucntion H(Z) of the following formula with respect to the output of said A/D convertor, and at the other of said steps operates in such a fashion as to add the output of said filter to said third and fourth ouput:

$$H(Z) = \frac{Z^0 + a_1 Z^{-1} + a_2 \times Z^{-2}}{Z_0 - b_1 Z^{-1} - b_2 \times Z^{-2}}$$

* * * * *